(12) United States Patent
Harrar et al.

(10) Patent No.: US 12,137,298 B2
(45) Date of Patent: *Nov. 5, 2024

(54) SELECTION OF ELECTRONIC CONTENT AND SERVICES

(71) Applicant: Comcast Cable Communications, LLC, Philadelphia, PA (US)

(72) Inventors: Derek T. Harrar, Devon, PA (US); Jack M. Birnbaum, Southampton, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,056

(22) Filed: Mar. 29, 2023

(65) Prior Publication Data

US 2023/0353703 A1 Nov. 2, 2023

Related U.S. Application Data

(63) Continuation of application No. 17/669,078, filed on Feb. 10, 2022, now Pat. No. 11,641,442, which is a
(Continued)

(51) Int. Cl.
*H04N 5/46* (2006.01)
*H04N 5/445* (2011.01)
(Continued)

(52) U.S. Cl.
CPC ............ *H04N 5/46* (2013.01); *H04N 21/4383* (2013.01); *H04N 21/4542* (2013.01);
(Continued)

(58) Field of Classification Search
CPC .......... H04N 21/4383; H04N 21/4542; H04N 21/482; H04N 21/4882; H04N 21/42204;
(Continued)

(56) References Cited

U.S. PATENT DOCUMENTS 5,461,427 A 10/1995 Duffield et al.
5,576,769 A 11/1996 Lendaro
(Continued)

FOREIGN PATENT DOCUMENTS

JP H08275073 A 10/1996
WO 2005/125200 A2 12/2005
(Continued)

OTHER PUBLICATIONS

International Search Report and Written Opinion for PCT/US2011/032463, mailed Jul. 15, 2011.
(Continued)

*Primary Examiner* — Randy A Flynn
(74) *Attorney, Agent, or Firm* — Banner & Witcoff, Ltd.

(57) ABSTRACT

A system and method for facilitating, selecting, or otherwise providing access to electronic content and services. Access to the content and services may be provided in such a manner as to facilitate access to higher quality forms of the content. The higher quality forms of the content may relate to any number of characteristics associated with displaying, transmitting, compressing, securing, and/or otherwise manipulating the content to more suitable forms relative to another form.

20 Claims, 2 Drawing Sheets

Related U.S. Application Data continuation of application No. 16/987,034, filed on Aug. 6, 2020, now Pat. No. 11,284,036, which is a continuation of application No. 11/755,116, filed on May 30, 2007, now Pat. No. 10,778,930.

(51) Int. Cl.

| | |
|---|---|
| *H04N 21/422* | (2011.01) |
| *H04N 21/431* | (2011.01) |
| *H04N 21/438* | (2011.01) |
| *H04N 21/454* | (2011.01) |
| *H04N 21/47* | (2011.01) |
| *H04N 21/482* | (2011.01) |
| *H04N 21/488* | (2011.01) |

(52) U.S. Cl.
CPC ....... *H04N 21/482* (2013.01); *H04N 21/4882* (2013.01); *H04N 5/445* (2013.01); *H04N 21/42204* (2013.01); *H04N 21/4316* (2013.01); *H04N 21/47* (2013.01)

(58) Field of Classification Search
CPC ...... H04N 21/4316; H04N 21/47; H04N 5/46; H04N 5/445
See application file for complete search history.

(56) References Cited

U.S. PATENT DOCUMENTS

| | | | |
|---|---|---|---|
| 6,034,677 | A | 3/2000 | Noguchi et al. |
| 6,108,044 | A | 8/2000 | Shin |
| 6,359,580 | B1 | 3/2002 | Morrison |
| 6,594,825 | B1 | 7/2003 | Goldschmidt Iki et al. |
| 6,772,433 | B1 | 8/2004 | LaJoie et al. |
| 7,061,542 | B1 | 6/2006 | Ikeguchi |
| 7,209,874 | B2 | 4/2007 | Salmonsen |
| 7,370,343 | B1 | 5/2008 | Ellis |
| 7,551,229 | B2 | 6/2009 | Ozaki et al. |
| 7,567,565 | B2 | 7/2009 | La Joie |
| 7,830,800 | B1 | 11/2010 | Masterson et al. |
| 7,924,451 | B2 | 4/2011 | Hirooka |
| 8,087,058 | B2 | 12/2011 | Cohen |
| 8,108,901 | B2 | 1/2012 | Nicas et al. |
| 8,166,504 | B2 | 4/2012 | Kang et al. |
| 8,239,573 | B2 | 8/2012 | Brownrigg, Jr. |
| 8,375,414 | B2 | 2/2013 | Covey |
| 8,935,726 | B2 | 1/2015 | Patel et al. |
| 9,003,441 | B1 | 4/2015 | Jindal et al. |
| 9,104,669 | B1 | 8/2015 | Des Jardins et al. |
| 9,241,170 | B1 | 1/2016 | Galligan |
| 9,578,363 | B2 | 2/2017 | Potrebic et al. |
| 10,015,223 | B2 | 7/2018 | Patel et al. |
| 2001/0019365 | A1 | 9/2001 | Kim et al. |
| 2002/0009289 | A1 | 1/2002 | Morishita et al. |
| 2002/0059602 | A1 | 5/2002 | Macrae et al. |
| 2002/0076194 | A1 | 6/2002 | Watanabe |
| 2002/0144276 | A1* | 10/2002 | Radford ............. H04N 21/2662 348/E7.071 |
| 2002/0145611 | A1 | 10/2002 | Dye et al. |
| 2002/0196939 | A1 | 12/2002 | Unger et al. |
| 2003/0051249 | A1 | 3/2003 | Hoang |
| 2004/0040039 | A1 | 2/2004 | Bernier |
| 2005/0044566 | A1 | 2/2005 | Jerding et al. |
| 2005/0180858 | A1 | 8/2005 | Halgas |
| 2005/0213938 | A1 | 9/2005 | Ozawa et al. |
| 2005/0244070 | A1 | 11/2005 | Itakura |
| 2005/0273807 | A1 | 12/2005 | Nissing |
| 2006/0005223 | A1 | 1/2006 | Weng et al. |
| 2006/0015580 | A1 | 1/2006 | Gabriel et al. |
| 2006/0061682 | A1 | 3/2006 | Bradley et al. |
| 2006/0123455 | A1 | 6/2006 | Pai et al. |
| 2006/0133775 | A1 | 6/2006 | Ju |
| 2006/0156352 | A1 | 7/2006 | Smith et al. |
| 2006/0171390 | A1 | 8/2006 | La Joie |
| 2006/0184992 | A1 | 8/2006 | Kortum et al. |
| 2006/0188235 | A1 | 8/2006 | Umei et al. |
| 2006/0222110 | A1 | 10/2006 | Kuhtz |
| 2006/0274203 | A1 | 12/2006 | Naganuma et al. |
| 2006/0282852 | A1 | 12/2006 | Purpura et al. |
| 2007/0101370 | A1 | 5/2007 | Calderwood |
| 2007/0157260 | A1 | 7/2007 | Walker |
| 2007/0192192 | A1 | 8/2007 | Haberman et al. |
| 2007/0204292 | A1 | 8/2007 | Riedl et al. |
| 2007/0204314 | A1 | 8/2007 | Hasek et al. |
| 2007/0207794 | A1 | 9/2007 | Dunko |
| 2007/0214488 | A1 | 9/2007 | Nguyen et al. |
| 2007/0223870 | A1 | 9/2007 | Farling et al. |
| 2007/0256111 | A1 | 11/2007 | Medford et al. |
| 2008/0034391 | A1 | 2/2008 | Lehman et al. |
| 2008/0046924 | A1 | 2/2008 | Hood |
| 2008/0066103 | A1 | 3/2008 | Ellis et al. |
| 2008/0107023 | A1 | 5/2008 | Kang |
| 2008/0141303 | A1 | 6/2008 | Walker et al. |
| 2008/0141317 | A1 | 6/2008 | Radloff et al. |
| 2008/0178219 | A1 | 7/2008 | Grannan |
| 2008/0195466 | A1 | 8/2008 | Wright |
| 2008/0201748 | A1 | 8/2008 | Hasek et al. |
| 2008/0222703 | A1 | 9/2008 | Mantani |
| 2008/0301749 | A1 | 12/2008 | Harrar et al. |
| 2008/0307485 | A1 | 12/2008 | Clement et al. |
| 2009/0025027 | A1 | 1/2009 | Craner |
| 2009/0028182 | A1 | 1/2009 | Brooks et al. |
| 2009/0031335 | A1 | 1/2009 | Hendricks et al. |
| 2009/0031384 | A1 | 1/2009 | Brooks et al. |
| 2009/0150958 | A1 | 6/2009 | Jerding et al. |
| 2009/0190028 | A1 | 7/2009 | Rodriguez et al. |
| 2009/0262136 | A1 | 10/2009 | Tischer et al. |
| 2010/0054712 | A1 | 3/2010 | Wollmershauser et al. |
| 2010/0150531 | A1 | 6/2010 | Corry et al. |
| 2010/0162292 | A1 | 6/2010 | Potrebic et al. |
| 2010/0180293 | A1 | 7/2010 | Brown et al. |
| 2010/0192180 | A1 | 7/2010 | Olague et al. |
| 2011/0102675 | A1 | 5/2011 | Jackson |
| 2011/0102683 | A1 | 5/2011 | Josephs |
| 2011/0103374 | A1 | 5/2011 | Lajoie et al. |
| 2011/0239242 | A1 | 9/2011 | Grevers, Jr. |
| 2011/0258665 | A1 | 10/2011 | Fahrny et al. |
| 2012/0072954 | A1 | 3/2012 | Karaoguz et al. |
| 2012/0084814 | A1 | 4/2012 | Olague et al. |
| 2012/0102535 | A1 | 4/2012 | Weintraub et al. |
| 2012/0284736 | A1 | 11/2012 | Friedman |
| 2013/0061259 | A1 | 3/2013 | Raman et al. |

FOREIGN PATENT DOCUMENTS

| | | |
|---|---|---|
| WO | 2007078503 A2 | 7/2007 |
| WO | 2008/042242 A2 | 4/2008 |
| WO | 09/118041 A1 | 10/2009 |

OTHER PUBLICATIONS

O'Donnell, White Paper, HDMI™: The Digital Display Link, Dec. 2006, 21 pages.

Extended European Search Report—EP 11769576.7—Mailing Date: Sep. 20, 2013.

Data-Over-Cable Service Interface Specifications, eDOCSIS™ Specification, CM-SP-eDOCSISI18-090529, Copyright 2003-2009 Cable Television Laboratories, Inc., 72 pages.

Canadian Office action—CA 2,632,295—Mailing date: Feb. 17, 2015.

Canadian Response to Office Action—CA App. 2,632,295—submitted Jul. 23, 2015.

Canadian Office Action—CA Appl. 2,632,295—dated Dec. 9, 2015.

European Office Action—EP Appl. 11769576.7—dated Feb. 6, 2017.

J. De Wachter et al., "Optimizing Channel Switching For Digital Television Through Low Quality Streams," an excerpt of the

(56) References Cited

OTHER PUBLICATIONS

Proceedings of the Sixth IASTED International Conference, Communication Systems and Networks, ACTA Press, 2007, pp. 55-62.

* cited by examiner

SELECTION OF ELECTRONIC CONTENT AND SERVICES

CROSS REFERENCE TO RELATED APPLICATIONS

This application is a continuation of and claims priority to U.S. patent application Ser. No. 17/669,078, filed on Feb. 10, 2022, which is a continuation of and claims priority to U.S. patent application Ser. No. 16/987,034, filed on Aug. 6, 2020 (now U.S. Pat. No. 11,284,036), which is a continuation of and claims priority to U.S. patent application Ser. No. 11/755,116, filed on May 30, 2007 (now U.S. Pat. No. 10,778,930), each of which is hereby incorporated by reference in its entirety.

FIELD OF THE INVENTION

The present invention relates to selecting or otherwise providing access to electronic content and services, such as but not limited to content and service provided by a cable television service provider.

BACKGROUND ART

Electronic content and services may be broadcasted or otherwise to users according to any number of protocols, standards, and formats, depending on any number of variables. Some of these parameters may provide better quality than the other formats, where quality may be defined in terms of transmission speeds, processing demands, viewing quality, size, or any number of other characteristics. The ability to access or otherwise support higher quality content may be dependent on capabilities of devices used to access the same.

For example, if content is carried in television signals, the ability of the devices to process certain television signals may determine when the users thereof are able to access higher quality content. Television signals may be broadcasted according to any number of standards (e.g., Moving Picture Expert Group (MPEG-3 or MPEG-4)) and formats (e.g., Standard Definition (SD) or High Definition (HD)). The ability of the devices to process the corresponding signals generally determines whether to access the various services is possible.

Some devices may be configured to process both several types of quality standards and/or formats, i.e., some devices may be able to process both SD and HD television signals. The ability of these devices may be advantageous if some content is broadcast at one quality and other content is broadcast at another quality, as it allows such devices to access both types of content. The ability of these devices to process both low and high quality content can be problematic if the content is broadcast in both SD and HD, which is common if the service provider is required to support SD only devices.

The problem generally relates to selecting lower quality signals when higher quality signals are available. For example, the users may select an SD television channel even though the same content is available on a supported HD television channel, which is problematic at least in so far as it is desirable that the customers desires to watch the highest quality content available. The present invention contemplates a solution wherein selection of (automatic in at least one embodiment) the higher quality content is provided or otherwise facilitated when the lower quality content is selected yet the higher quality content is available or otherwise supported.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 5 illustrates a channel map that may be used in accordance with one non-limiting aspect of the present invention to automatically determine the availability of higher quality content.

DETAILED DESCRIPTION OF THE PREFERRED EMBODIMENT(S)

Figure 1:
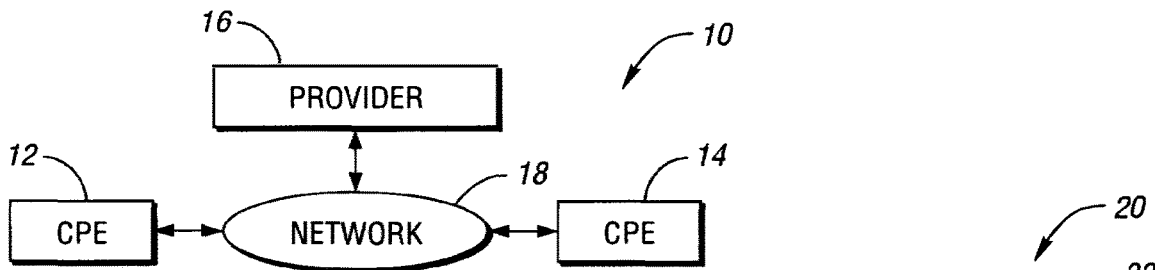
FIG. 1 illustrates a system for providing or otherwise supporting delivery of electronic media and services in accordance with one non-limiting aspect of the present invention.

FIG. 1 illustrates a system 10 for providing or otherwise supporting delivery of electronic media and services in accordance with one non-limiting aspect of the present invention. The system 10 may include a number of pieces of customer premises equipment (CPE) 12, 14, a media provider 16, and a network 18. The system 10 may be generally referred to as a media content distribution network wherein media content is electronically transferred over the network 18 to the CPE 12, 14.

The media provider 16, for exemplary purposes, is most prominently described with respect to being a television service provider having capabilities for providing television, telecommunications, and/or high-speed data services to subscriber locations, primarily through wireline and/or wireless communications. The present invention fully contemplates the provider 16 being associated with any type of television service provider, including, for example, cable, IP, broadcast, satellite, etc. and non-television providers, such as those associated with high-speed data, telecommunications, cellular communications, and the like.

The media provider 16 may be configured to support and/or facilitate the use of any number of television and non-television services and applications, such as, but not limited to email services, data transmission service, linear and non-linear television programming/signaling (cable, satellite, broadcast, etc.), Video on Demand (VOD), interactive television (iTV), interactive gaming, pay-per-view (PPV), digital video recording (local and remote), and/or broadcasting of signals associated with supporting television programming, movies, audio, and other multimedia, as well as, downloading of clips or full-length versions of the same.

The network 18 may include any number of features and devices to facilitate signal transportation and other operations associated with interfacing the subscriber locations with each other and otherwise supporting communications associated with services of the media provider 16. The network 18 may include terrestrial and celestial components and infrastructures, including cable lines, telephone lines, and/or satellite or other wireless architectures. The network may be associated with other private and/or public networks, such as the Internet and dedicated or virtual private networks.

The CPE 12, 14 may relate to any device, element, and/or other feature associated with interfacing users with various services associated with the media provider, such as but not limited to a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), mobile device (phone, computer, etc.), personal media device, and any other item having capabilities to supporting access to any number of the services.

The CPE 12, 14 may be configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

Media may be associated with and/or controlled by the media provider 16 (which in turn may receive the content from other sources). The media may be sourced from the media provider directly, from one or more of the CPE 12, 14 connected to the network 18, by, but not limited to peer-to-peer environments, and/or from any other source in communication with the network 18 (internet, etc.). For example, if the media provider 16 is a television service provider, a portion of the media content may relate to television programs, movies, and other multimedia packets. The media content may be delivered to the subscriber locations directly from the media service provider 16 and/or from one or more of the other CPEs 12-14 in communication with the network 18.

Figure 2:
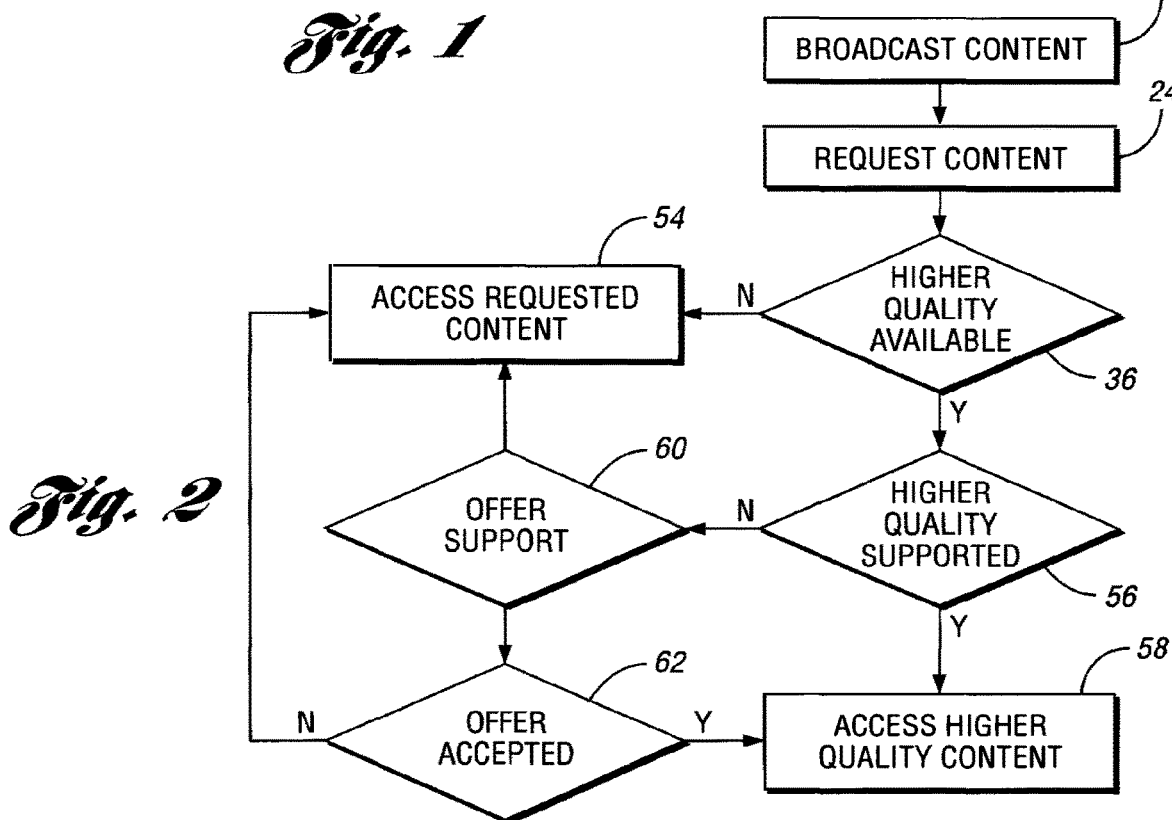
FIG. 2 illustrates a flow chart of a method of accessing electronic content in accordance with one non-limiting aspect of the present invention.

FIG. 2 illustrates a flow chart 20 of a method of accessing electronic content in accordance with one non-limiting aspect of the present invention. The method generally relates to providing customers or other users of media access devices, such as but not limited to STB, access to higher quality versions of requested/desired media content. Without intending to limit the scope and contemplation of the present invention, the method is directed to accessing higher quality television signals provided by a cable television service provider. The present invention fully contemplates its use in any number of environments and is not intended to be limited by the exemplary illustration provided below.

Block 22 relates to the media service provider broadcasting or otherwise distributing media content through electronic communications. The media may be electronically communicated through any number of communication means and mechanisms, including but not limited to communications based upon a regional enterprise configured to broadcast the electronic media to a number of subscribers located in the corresponding region, i.e., a cable television headend configured for broadcasting standard definition (SD), high definition (HD), or otherwise formatted television signals.

Block 24 relates to receiving a request for accessing the broadcast media content such as but not limited to a request made by a user to a STB for tuning to television signals associated with the television channel having the desired content. The request may be determined through a user command made to the STB, such as but not limited to channel change commands issued from a remote control, and/or through some other interaction with the STB, such as but not limited to manipulation of a user interface (UI).

Figure 3:
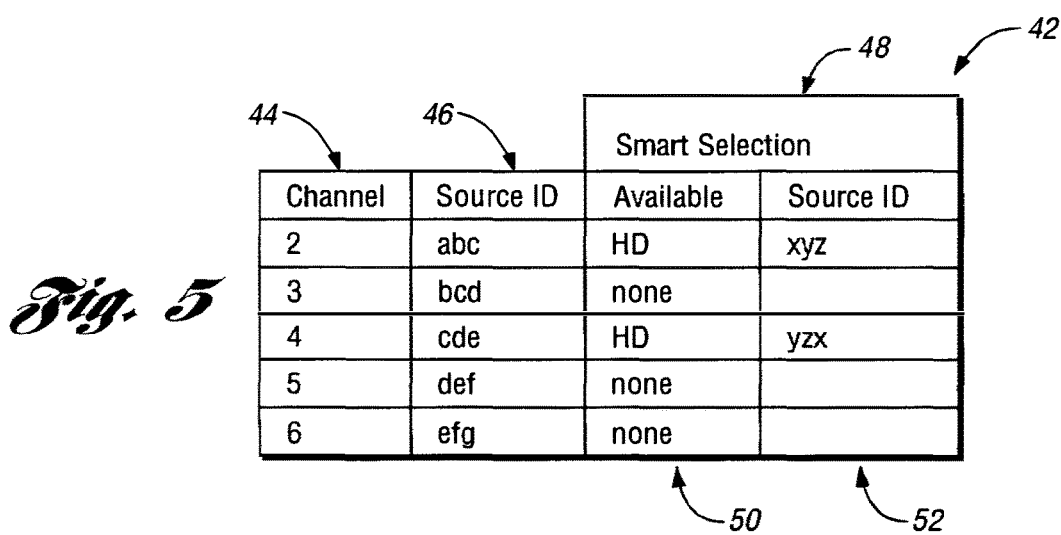
FIGS. 3 and 4 illustrate a user interface in accordance with one non-limiting aspect of the present invention that may be used to facilitate requesting a media content.
Figure 3:
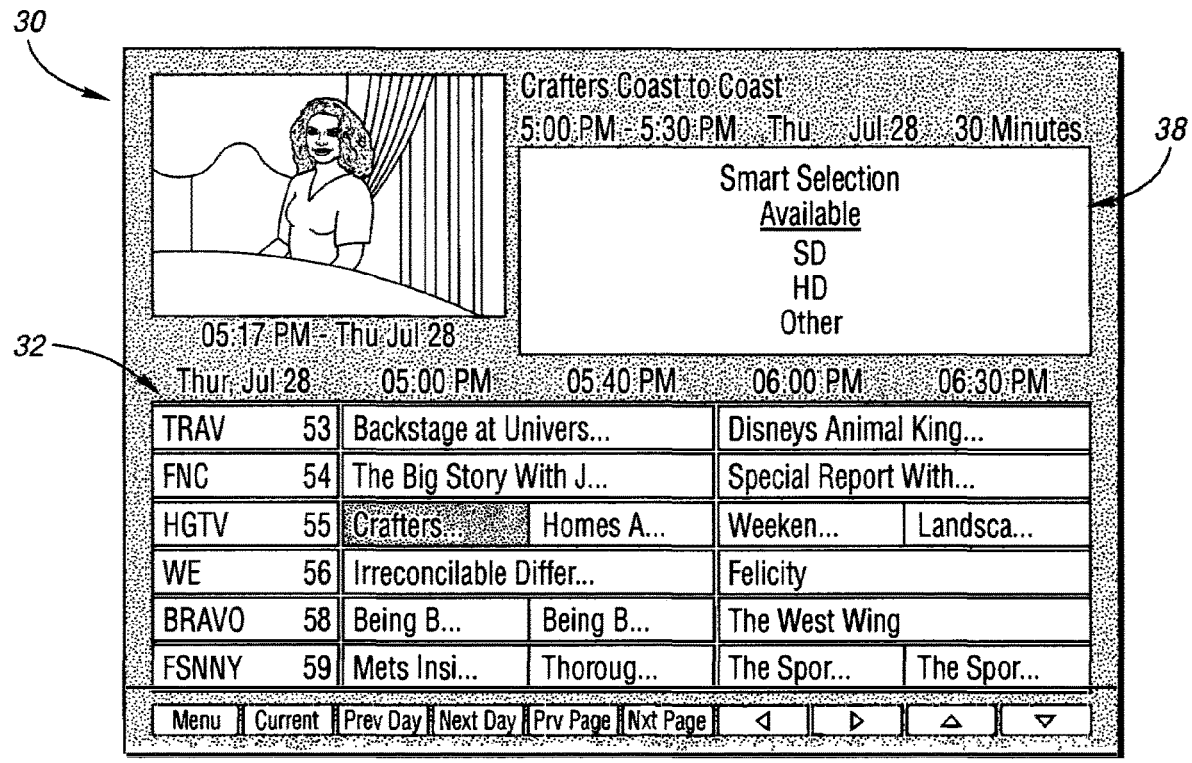
Figure 4:
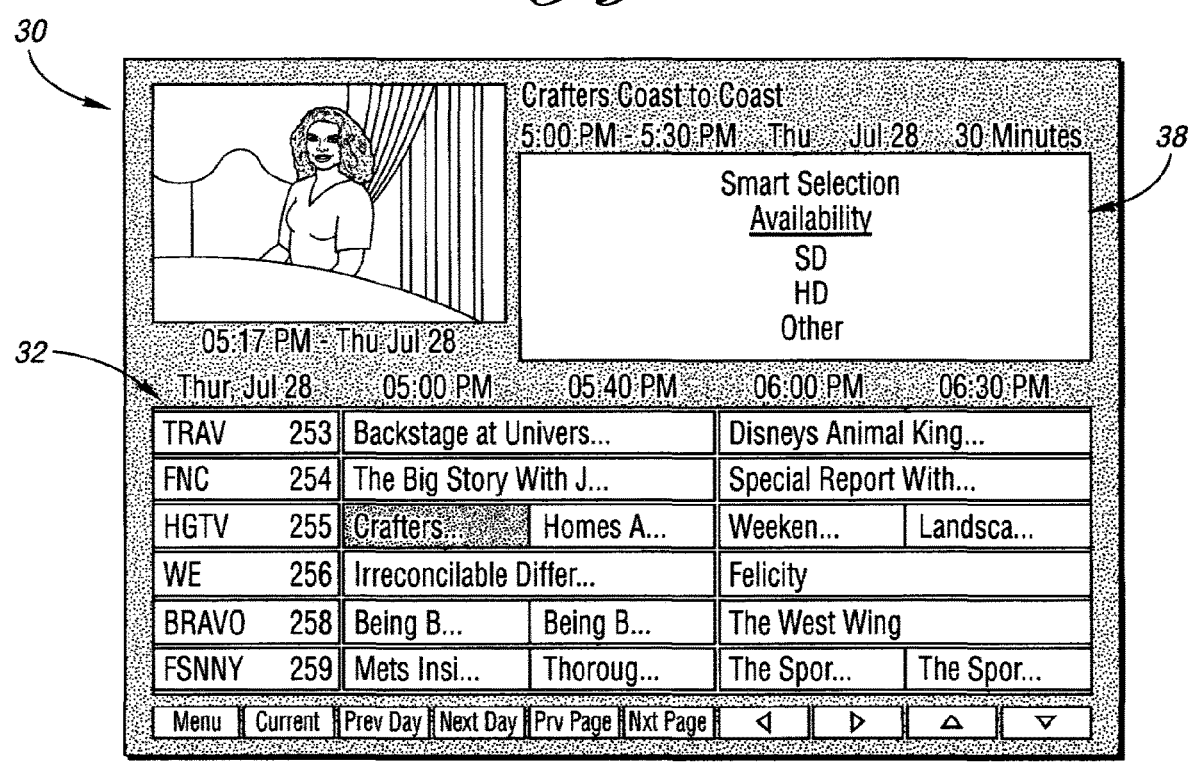

FIGS. 3 and 4 illustrate a user interface 30 in accordance with one non-limiting aspect of the present invention that may be used to facilitate requesting a media content. The user interface 30 may generally be referred to as an electronic programming guide (EPG) having a channel selection area 32. The channel selection area 32 may include a grid array for listing a number of channels and programs showing on those channels during particular time periods. A cursor or other feature may be actuated to highlight various cells within the array, which may then be selected to access the content associated therewith, i.e., to tune to the channel showing during a current time slot, to show additional information, and/or to perform some other related function, such as but not limited to setting a DVR recording or on-demand delivery.

Block 36 relates to determining whether a higher quality version of the content requested in Block 24 is available. The higher quality version may relate to another broadcast of the same content having better transmission speeds, processing demands, viewing quality, size, or any number of other improved characteristics relative to the previously requested content. One non-limiting example of the present invention relates to initially requesting SD television channels and determining whether higher quality television channels are available, i.e., HD television channels. The determination of the higher quality content may be made according to or as a function of any number of operations.

The availability of additional or higher forms of the content may be selected by the user through interaction with the UI 30 illustrated in FIGS. 3 and 4. For example, the user highlights a particular cell within the channel selection area 32, (the cell corresponding to channel 55 at 5:00 pm, which relates to Crafters Coast to Coast). A smart selection window 38 is displayed upon selection or highlighting of the cell which in turn displays the available formats for the requested content. As shown, the smart selection window 38 indicates the requested content is available in SD and HD formats, the first listed or highlighted format being the currently selected format/quality. Optionally, other formats may be similarly shown in the window to indicate other lower or higher quality formats.

From the smart selection window 38, the user may select one of the available formats, such as the indicated HD format. The UI 30 shown in FIG. 4 is displayed upon selection of the HD format. The HD selection may change the appearance of the UI 30 to a corresponding HD portion of the EPG having HD programming. As shown, multiple channels having HD format may be included with the numeral '2' occurring before the channel number. The smart selection menu may then change from highlighting the SD portion (FIG. 3) to highlighting the HD portion.

FIG. 5 illustrates a channel map 42 that may be used in accordance with one non-limiting aspect of the present invention to determining availability of higher quality content. The channel map 42 may include a "Channel" column 44 for listing a number of available channels and a "Source ID" column 46 having an assigned source for each channel. The channel map 42 may be accessed automatically by the STB upon receiving a channel change command or other user input. In the alternative, the system may automatically select a higher quality channel corresponding to the user selected lower quality channel by first determining if the higher quality channel is available and if the user if provisioned for such higher quality service. If the higher quality channel is available and the user is provisioned to access the higher quality service the STB will automatically tune to the higher quality channel.

The channel map 42 may be configured to associate source IDs in the Source ID column 46 with various channels in the Channel column 44 that are available to the subscriber. When a channel change command is received, the STB may consult the channel map 42 to determine instructions or other information associated with tuning to or otherwise accessing the selected channel. The source ID column 46 may be used to provide instructions or other information associated with tuning to or otherwise accessing the desired content.

The channel map 42 may further include a smart selection portion 48 to facilitate determining whether higher quality versions of the requested content are available. The higher quality versions of the requested content may be determined from the smart selection portion 48 as a function of the channels selected in the channel column 44. The smart selection portion 48 may include an "Available" column 50 for listing available forms of the content and a second "Source ID" column 52 for locating or otherwise accessing the additionally available content.

Some or all of the channels may include additional versions of the content and/or only a portion of the channels may not include additional versions, such as those indicated with "none". While only one additional form of the content is shown to be available for those channels having additional content, i.e. HD, the present invention fully contemplates multiple forms of the content being available, besides HD The channel map 42 may be downloaded or otherwise utilized with the STB. The STB may consult the channel map 42 to locate the requested content as a function of the channel associated therewith and the corresponding smart selection portion 48 to determine whether additional forms of the content are available. This may provide an automated process for determining the availability of additional forms of the content without requiring user interaction.

Returning to FIG. 2, Block 54 is reached if higher quality forms of the requested content are unavailable. This occurs, for example, if the user has already selected the highest form of content and/or if no other higher forms of the content are available. Thereafter, the STB automatically tunes to the requested content.

Block 56 is reached if higher quality forms of the content are available. Block 56 relates to determining whether the higher quality forms are supported on the device requesting the content. The suitability of the higher quality forms may be determined as a function of user inputs or other configurations of the STB or device attempting the access the content. The user or a technician may input capabilities of the device through interaction with a UI and/or in any other manner. The suitability may also be automatically determined by the STB as a function of devices connected thereto, such as if a cable is connected to an HD enabled display, if the STB is connected to a HD tuner, etc.

Block 58 is reached if the higher quality content is available and supported on the STB or other device attempting to access the content. Block 58 relates to tuning to the higher quality content instead of the previously selected lower quality form. This includes the STB, for example, tuning to channel 255 (HD) instead of the selected lower quality channel 55 (SD). Of course, access to the higher quality content may include other operations.

A display or other feature on the STB may also be changed to reflect the higher quality content tuned to in Block 58. If channel 55 is selected, the STB will automatically display channel 255 (the corresponding higher quality channel). This may be helpful in educating the user to the higher quality channel number.

Alternatively, the STB display may not display the higher quality channel number and instead display the lower quality channel number, even though the higher quality form of the content is accessed. This may be helpful in preventing confusion or other misinterpretations by the user not understanding why the wrong channel number of showing for the requested content, while allowing the STB to tune to the higher quality form.

If higher quality content is available and the STB is unable to support the higher quality content, Block 60 may be reached. Block 60 relates to offering support for the higher quality content. This may include making an offer to the subscriber to purchase or otherwise upgrade their subscription in order to access the content. The UI or other feature may be used to communicate the offer. Block 62 relates to tuning to the lower quality content if the offer is denied and tuning to the higher quality content if the offer is accepted.

As described above, one non-limiting aspect of the present invention relates to automatically or with some user interaction facilitating access to higher quality content when a subscriber or device attempts to access lower quality content. The present invention is predominately described with respect to tuning an STB to higher quality television signals available on non-selected channels. The present invention, however, is not intended to be so limited and fully contemplates facilitating access to higher quality forms of any type of content and not just content carried over television signals.

One non-limiting aspect of the present invention relates to allowing providers to offer the higher quality forms of the content without requiring the subscribers to be previously aware of the higher quality content or to be aware of the capabilities of their device to access the content. The subscribers may be given the opportunity to purchase the higher quality forms of the content and the suitability of the subscriber's device to access the content may be determined from a configuration of the device and/or from elements connected thereto.

One non-limiting aspect of the present invention relates to automatically preventing subscribers from continuously attempting to access higher quality forms of content if the subscribers are not entitled to access the content and/or if their device is unsuitable to such access. This may include automatically offering to support the higher quality content if the subscriber attempts to tune to the higher quality content when not entitled and/or issue a message or other warning to the subscriber if the device is unsuitable for accessing the higher quality content.

One non-limiting aspect of the present invention relates to allowing cable television service providers or other electronic media distribution entities to support multiple quality formats. For example, one non-limiting aspect of the present invention relates to a system for supporting standard definition (SD) and high definition (HD) television channel broadcasting. The system may include a regional enterprise configured for broadcasting SD and HD television signals to a number of STBs. The STBs may be configured to automatically tune to an HD television channel having content corresponding to a requested SD television channel such that the provider may broadcasts multiple types of content without having to target the higher quality content to specific subscribers, as the subscriber devices can instead be relied upon to automatically access the higher quality content if available.

If a portion of the STBs are HD enabled and portion of the STBs are not HD enabled, the regional enterprise may be configured to enable the HD enabled STBs to automatically tune to HD television channels without having to perform any substantial operations with respect to the non-HD enabled STBs. If a portion of the HD enabled STBs are associated with non-HD enabled televisions, the regional enterprise may be configured to instruct the HD enabled STBs associated with the non-HD enabled televisions to prevent tuning to HD television channels and instead allow the HD enabled STB to tune to SD television channels.

One non-limiting aspect of the present invention relates to an algorithm or other logically functioning element having suitable capabilities such that, when a service is selected/requested, it can look up the service in a channel map or other feature and set a tuner or other feature to a frequency or other variable to access a higher quality form of the selected/requested service. Optionally, the algorithm may include some or all of the following processes: (1) user selects/requests a service by channel number or via channel up/down keys; (2) software controlling the channel acquisition may lookup the selected/requested service to determine its source ID; (3) the software may also determine if there are alternative formats available for that service (content); (4) if alternative formats are available it may compare the available formats with the selected output device to determine the highest quality match; (5) the selected high quality match may then be used to tune the tuner and select the service from the QAM; (6) the channel number displayed on the LEDs or on the On-screen display may reflect the user's selected channel, which may be independent of the actual service selected/requested/acquired; and (7) this process may repeat upon another channel change.

One non-limiting aspect of the present invention relates to understand type of display device is being used or attempted for use with requested content so as to facilitate assessing whether the higher quality content can be supported on the associated display device. This may be automatically determined without subscriber interaction, such as but not limited to assessments carried out over HDMI or DVI cables used to connect the STB to HD-enabled displays.

One non-limiting aspect of the present invention relates to a smart selection capability that may enhance user experiences for valued high end subscribers. This may simplify the channel selection and allow providers to display the highest quality experience. In the future the selection methodology can be applied to targeting different advertising to different users based on which format of service is selected (perhaps a demographic of the high end video user). This same concept can also be applied to the Audio formats available and provided by the settop device.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method comprising:
   receiving, by a computing device, a request for content in a second definition format that is higher than a first definition format of the content;
   changing, based on the receiving the request for the content in the second definition format and subsequently accessing the content in the second definition format, a demographic associated with a user from a first demographic to a second demographic;
   determining, based on the second demographic, an advertisement associated with the content in the second definition format, wherein the advertisement is different from another advertisement associated with the content in the first definition format; and
   outputting, to a display device, the content in the second definition format and the advertisement associated with the content in the second definition format.

2. The method of claim 1, wherein the second demographic comprises a wealthier demographic than the first demographic.

3. The method of claim 1, wherein the first definition format is a standard definition (SD) format and the second definition format is a high definition (HD) format.

4. The method of claim 1, wherein the content in the second definition format comprises a broadcast television program.

5. The method of claim 1, wherein the content in the second definition format comprises an on-demand program.

6. The method of claim 1, wherein the receiving the request comprises receiving a channel change command.

7. The method of claim 1, wherein the receiving the request comprises receiving a selection of a portion of an electronic programming guide.

8. The method of claim 1, wherein the receiving the request comprises receiving a request to record the content.

9. The method of claim 1, further comprising:
   prior to the changing, determining that the computing device is provisioned to access the content in the second definition format.

10. The method of claim 1, further comprising:
    prior to the changing, determining that the computing device or the display device is suitable for displaying the content in the second definition format.

11. The method of claim 1, further comprising:
    outputting a user interface for specifying whether the display device is able to display the content in the second definition format.

12. The method of claim 1, further comprising:
    after the receiving the request for the content in the second definition format, determining whether the computing device is permitted to access the content in the second definition format; and
    based on determining that the computing device is not permitted to access the content in the second definition format, outputting an offer to access the content in the second definition format;
    wherein the accessing the content in the second definition format is based on acceptance of the offer to access the content in the second definition format.

13. A system comprising:
one or more processors configured to cause an apparatus to:
receive a request for content in a second definition format that is higher than a first definition format of the content;
change, based on receiving the request for the content in the second definition format and subsequently accessing the content in the second definition format, a demographic associated with a user from a first demographic to a second demographic;
determine, based on the second demographic, an advertisement associated with the content in the second definition format, wherein the advertisement is different from another advertisement associated with the content in the first definition format; and
output, to a display device, the content in the second definition format and the advertisement associated with the content in the second definition format; and
a computing device configured to send the content in the second definition format.

14. The system of claim 13,
wherein the second demographic comprises a wealthier demographic than the first demographic; and
wherein the first definition format is a standard definition (SD) format and the second definition format is a high definition (HD) format.

15. The system of claim 13, wherein the request comprises a channel change command, a selection of a portion of an electronic programming guide, or a request to record the content.

16. The system of claim 13, wherein the one or more processors are configured to cause the apparatus to:
prior to changing the demographic, determine that the apparatus is provisioned to access the content in the second definition format.

17. One or more non-transitory computer-readable media storing instructions that, when executed, cause a computing device to:
receive a request for content in a second definition format that is higher than a first definition format of the content;
change, based on receiving the request for the content in the second definition format and subsequently accessing the content in the second definition format, a demographic associated with a user from a first demographic to a second demographic;
determine, based on the second demographic, an advertisement associated with the content in the second definition format, wherein the advertisement is different from another advertisement associated with the content in the first definition format; and
output, to a display device, the content in the second definition format and the advertisement associated with the content in the second definition format.

18. The one or more non-transitory computer-readable media of claim 17,
wherein the second demographic comprises a wealthier demographic than the first demographic; and
wherein the first definition format is a standard definition (SD) format and the second definition format is a high definition (HD) format.

19. The one or more non-transitory computer-readable media of claim 17, wherein the request comprises a channel change command, a selection of a portion of an electronic programming guide, or a request to record the content.

20. The one or more non-transitory computer-readable media of claim 17, wherein the instructions, when executed, cause the computing device to:
prior to changing the demographic, determine that the computing device is provisioned to access the content in the second definition format.

* * * * *